Patented Nov. 26, 1935

2,021,987

UNITED STATES PATENT OFFICE 2,021,987

RECOVERY OF VALUES FROM LITHIUM BEARING ORES

Henry Seymour Colton, Shaker Heights, Ohio, assignor to The Grasselli Chemical Company, Cleveland, Ohio, a corporation of Delaware Application January 20, 1934, Serial No. 707,618

3 Claims. (Cl. 23—31)

This invention relates to processes for recovering lithium, sodium, and potassium values from lithium bearing ores, and is especially directed to processes wherein a hot solution containing lithium, sodium, and potassium compounds is treated to remove lithium therefrom, next treated to remove sodium and potassium, and then recycled to conserve unrecovered lithium, sodium, and potassium values.

In the prior art, it has been the practice to treat a lithium bearing ore to render soluble the lithium values contained therein. At the same time, large amounts of sodium and potassium compounds are rendered soluble together with rather small amounts of aluminum, iron, manganese, etc., compounds.

The ore is then leached to remove the soluble lithium compounds therefrom. The solution obtained also contains, of course, the soluble sodium, potassium, aluminum, iron, etc., compounds.

The impurities such as aluminum and the heavy metals may then be preferentially precipitated from the solution. In that case, the lithium is then precipitated, preferably as lithium carbonate.

Another mode of treatment for the solution obtained by leaching the ore is that disclosed and claimed in U. S. application Serial Number 707,522, filed January 20, 1934, by Robert Pfanstiel and Harry P. Corson. According to the process the lithium, jointly with impurities other than sodium and potassium compounds, is precipitated with a carbonate reagent. The joint precipitate is subsequently treated to obtain pure lithium compounds therefrom. This process forms no part of the present invention.

Because of the slight solubility of lithium carbonate, the remaining solution from which lithium has been removed as carbonate contains lithium carbonate as well as sodium and potassium compounds.

It is an object of my invention to so treat solutions of the type remaining in the above described processes as to conserve the unrecovered lithium compounds and to recover sodium and potassium values.

According to my invention, the remaining solution is cooled to cause the precipitation of sodium and potassium compounds. This precipitation follows from the fact that sodium and potassium compounds are less soluble in cold water than in hot. The cooled solution still contains, of course, the amount of sodium and potassium compounds soluble therein at the prevailing low temperature.

The lithium carbonate, on the contrary, is less soluble in hot water than in cold. Consequently, the cooling of the solution to remove sodium and potassium compounds does not tend to make the lithium carbonate salt out.

The residual solution contains the amount of sodium and potassium compounds soluble therein, together with the quantity of lithium carbonate soluble in the warmer solution.

It is an object of my invention to conserve these unrecovered lithium, sodium, and potassium values, and this I accomplish by recycling the residual solution. I preferably return this solution to the leaching step where it is used to dissolve more sodium, potassium, and lithium compounds.

Figure 1:
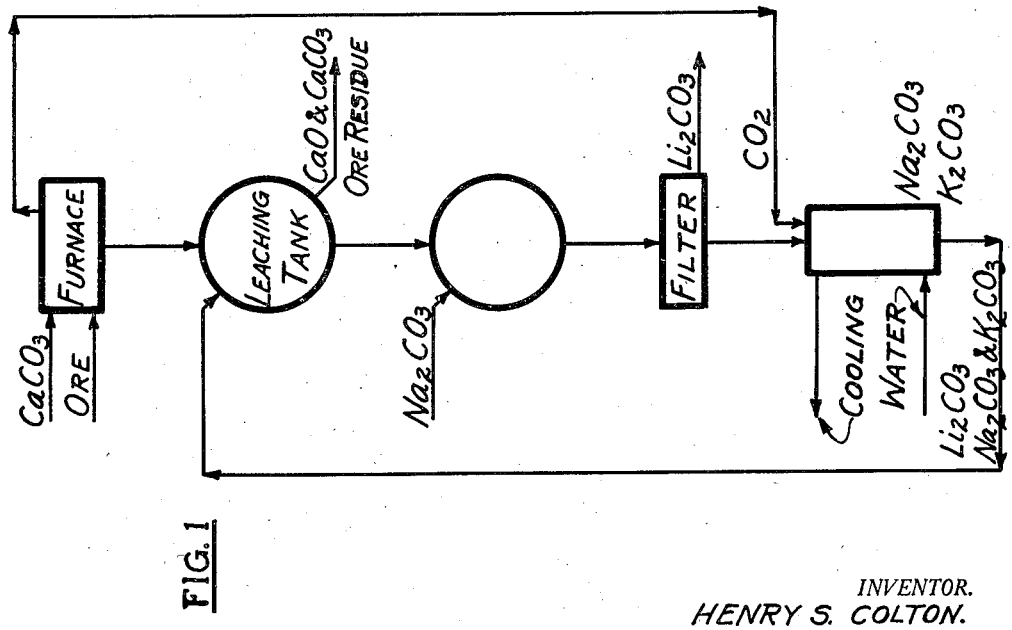
Figure 1 shows an embodiment of my invention wherein calcium carbonate is used as an ore treating agent.

In order more fully to explain my invention I shall discuss one specific embodiment using calcium carbonate as an ore treating agent. Reference should be had to Figure 1 which shows this specific process.

A lithium bearing ore, lepidolite, was mixed with calcium carbonate and the mixture calcined. At the prevailing high temperature the calcium carbonate decomposed, freeing carbon dioxide. This carbon dioxide was utilized later in the process.

The lithium, sodium, and potassium in the ore were replaced by calcium in a base exchange type of reaction. The lithium, sodium, and potassium were thus converted to soluble hydroxides.

After the calcination the calcined mass was transferred to a tank and there leached with a carbonate-containing mother liquor recycled from a later point in the process. This mother liquor, which contains lithium, sodium, and potassium carbonates, reacts with the calcium hydroxide present to form the less soluble calcium carbonate. In this way the amounts of calcium dissolved by the solution as an impurity may be somewhat decreased. Other impurities such as ferrous iron, etc., may likewise be rendered less soluble. The relatively large amount of calcining agent always used precludes the possibility of lithium being precipitated as carbonate at this point, as there will never be more carbonates present than are required to convert all of the calcium hydroxide to the more insoluble calcium carbonate. The calcined mass was still hot when leached, and consequently the solution of soluble materials was at a rather high temperature. If necessary, additional water may be used in the leaching to replace evaporation losses and to insure complete extraction of values from the ore.

The hot solution was decanted from the ore residues, and run into a treating tank. At this point the solution contained lithium, sodium, and potassium as hydroxides. It also contained very small amounts of calcium, magnesium, and other impurities as hydroxides.

The hot solution was then treated with sodium carbonate to jointly precipitate lithium and such impurities as precipitate in carbonate solution. This procedure for the removal of lithium compounds constitutes no part of the present invention, as noted above. On the addition of carbonate the lithium precipitated as carbonate, the ferric iron and aluminum as hydroxides, and the calcium, ferrous iron, etc. as carbonates. The solution of sodium and potassium compounds was separated from the precipitate by filtration. The precipitate was then treated to separate lithium from the impurities.

The filtered solution contained sodium and potassium compounds and, by reason of its solubility, some lithium carbonate. The solution was run into a cooling receptacle where its temperature was lowered. The carbon dioxide obtained from the furnace was used to convert the sodium and potassium hydroxides to carbonates.

As the sodium and potassium compounds are less soluble in cold water than in hot, some salt out and may be removed as by filtration. The lithium carbonate, however, is more soluble in cold water than in hot so there is little danger of losing lithium at this point.

After sodium and potassium carbonates are removed, the solution still contains some lithium carbonate, sodium carbonate, and potassium carbonate. In order to avoid the loss of these unrecovered carbonates, the solution was returned to the leaching tank. In the leaching tank the alkali metal carbonates were converted to alkali metal hydroxides by some of the excess calcium hydroxide present, a corresponding amount of calcium hydroxide, of course, being converted to calcium carbonate. As the returned solution was not saturated at the high temperature of the leaching operation, it dissolved a part of the soluble values from the ore.

On the first few cycles of operation the sodium and potassium compounds may not be present in a large enough quantity to salt out, but because of the recycling they build up until on cooling they will precipitate.

The lithium, on the other hand, is removed on each cycle and does not build up. The cooled solution never contains more lithium carbonate than is soluble in the volume of hot water used.

While I have shown one illustrative mode of procedure I do not intend to be limited thereto.

Instead of using calcium carbonate as a calcining agent I may use calcium hydroxide or calcium oxide. In this event the sodium compounds will be recovered as carbonates using carbon dioxide from some other source.

Figure 2:
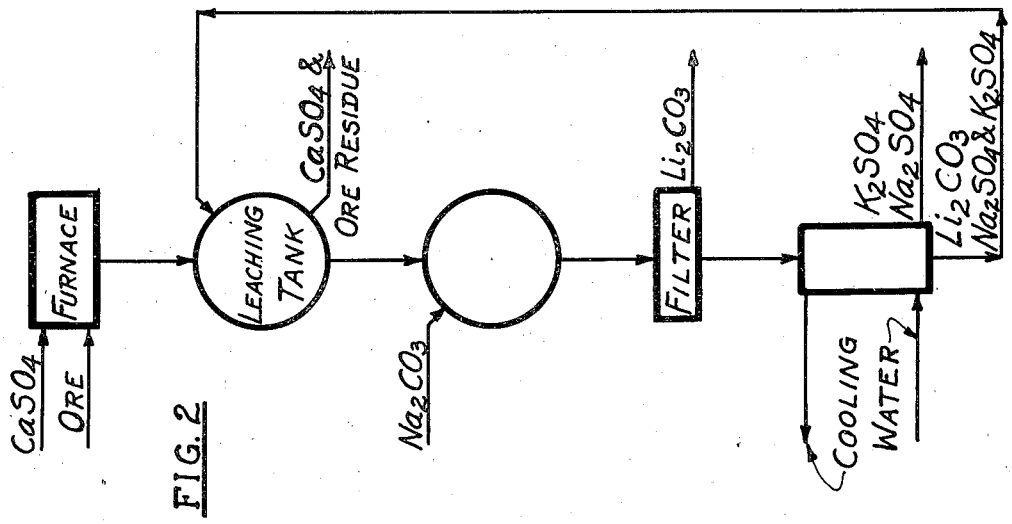
Figure 2 shows a modification using calcium sulfate as an ore treating agent.

In Figure 2 there is illustrated a process using calcium sulfate as the calcining agent. This mode of calcination constitutes no part of the present invention and is fully described and claimed in U. S. application Serial Number 707,611, filed January 20, 1934, by Robert Pfanstiel. According to this process the ore is calcined with calcium sulfate and the calcined mass, as in the process of Figure 1, leached with a mother liquor containing lithium carbonate and sodium and potassium compounds.

The solution obtained by leaching the ore is treated with sodium carbonate to precipitate lithium compounds and impurities, and, after filtration, the sodium and potassium sulfate solution remaining is cooled to salt out the sodium and potassium sulfates from their mother liquor.

In this process, as in the process of Figure 1, the unrecovered lithium carbonate is safe from precipitation on cooling of the solution.

As heretofore discussed, the lithium, sodium, and potassium values are conserved by returning the mother liquor to the leaching tank.

In both of the specific processes above described the sodium added as sodium carbonate to precipitate lithium as carbonate was recovered together with the sodium and potassium values obtained from the ore.

If such calcining agents as sodium or potassium compounds are used, the sodium or potassium values so added are likewise recovered according to the teachings of my invention.

While I have illustrated my processes with one manner of separating the lithium compounds from the solution, I do not intend to be limited thereto. I may remove lithium compounds in any desired manner. For instance, the impurities might first be preferentially precipitated with a carbonate reagent and then the lithium compounds precipitated as carbonate, phosphate, etc. Instead of using sodium carbonate as the carbonate reagent I may use potassium carbonate, sodium bicarbonate, etc.

Also, while I have mentioned a few specific calcining agents I do not intend to be limited thereto. I may use any calcining agent which will extract lithium, sodium, and potassium values from the ores treated, such as sulfuric acid, potassium chloride, potassium sulfate, sodium chloride, sodium sulfate, etc.

I claim:

1. In a process for the recovery of lithium, sodium, and potassium values, the steps comprising: leaching lithium, sodium, and potassium compounds from insoluble ore residues, precipitating the lithium as carbonate from the solution so obtained while the solution is hot, separating the precipitate from the solution, cooling the solution to separate sodium and potassium compounds from unrecovered lithium values therein, and returning the residual solution to the leaching step.

2. In a cyclic process for the recovery of lithium, sodium, and potassium values from ores, the steps comprising: calcining the ore with a calcining agent, leaching the calcined mass with a mother liquor which contains lithium carbonate and sodium and potassium compounds, treating the resulting solution, while hot, to precipitate lithium as carbonate, separating the precipitate from the remaining solution, cooling the remaining solution to separate sodium and potassium compounds from their mother liquor and from unrecovered lithium values, and returning the mother liquor to the leaching step.

3. In a cyclic process for the recovery of lithium, sodium, and potassium values from an ore, the steps comprising: calcining the ore with a calcining agent to convert the lithium, sodium, and potassium values to soluble compounds, dissolving the lithium, sodium, and potassium values from the ore, treating the solution so obtained, while hot, to precipitate at least a part of the lithium values as carbonate, separating precipitated lithium carbonate from the solution, cooling the solution to separate at least a part of the sodium and potassium values therefrom without a substantial separation at this point of lithium values, and returning the residual solution to the dissolving step in order to keep the unrecovered lithium, sodium, and potassium values in the system.

HENRY SEYMOUR COLTON.